June 24, 1958 F. BÄCKLIN ET AL 2,840,624
MULTI-CELL ELECTRIC BATTERIES
Filed April 26, 1955 3 Sheets-Sheet 3

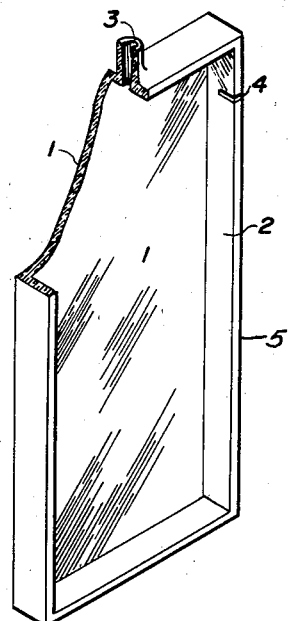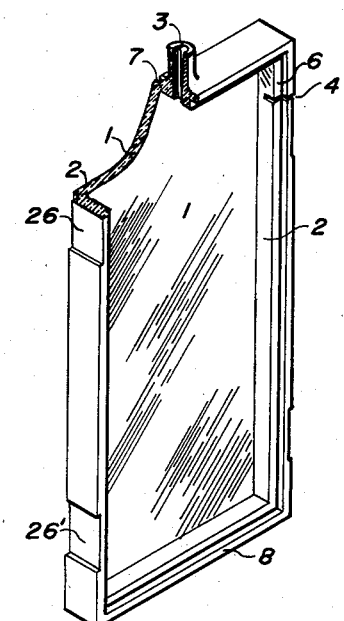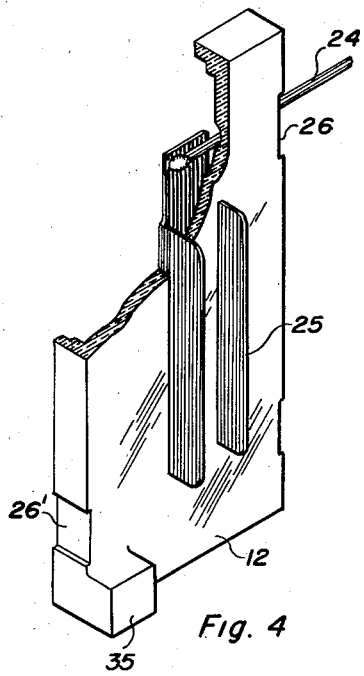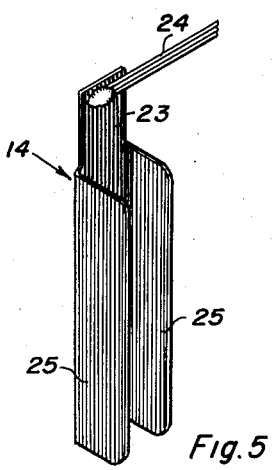
F. BÄCKLIN
B. L. FORSÉN
P. Å. LÖWNERTZ
INVENTORS.

F. BÄCKLIN
B.L. FORSÉN
P.Å. LÖWNERTZ
INVENTORS.

BY
AGENT.

United States Patent Office 2,840,624
Patented June 24, 1958

2,840,624

MULTI-CELL ELECTRIC BATTERIES

Folke Bäcklin, Björn Lennart Forsén, and Per Åke Löwnertz, Uppsala, Sweden, assignors to Yardney International Corp., New York, N. Y., a corporation of New York Application April 26, 1955, Serial No. 503,938

13 Claims. (Cl. 136—30)

Our present invention relates to multi-cell electric batteries.

In the conventional series arrangement of the cells of electromechanical batteries (e. g. silver-zinc accumulators) the active elements thereof, such as the electrodes, the separators and the electrolyte, occupy only a relatively small part of the overall volume of the battery a substantial portion of this volume being used to accommodate the electrical couductors required for connecting the several cells in series.

The invention has for its object to provide such an arrangement of the individual cell casings as to enable the use of relatively thin partitions therebetween, at the same time allowing the electrical connections between the cells to be disposed in such manner as to occupy but little room without in any way impairing the electrical properties thereof and without any risk of electrolyte leakage through the cutouts provided in the casing walls for these connections or through the filling apertures of the casings.

A cell assembly for electric batteries or accumulators according to the invention comprises a separate, preferably prismatic tray-like casing (e. g. of plastic material) for each of a plurality of stacked cells. A feature of this assembly is that the casing of each cell in the stack, with the exception of the last one, defines an electrode chamber having one of its walls formed by the casing of the next cell; the last cell is closed by a separate cover member.

Other features of the invention will become more fully apparent from the following description of several embodiments, reference being had to the accompanying drawing in which:

Fig. 1 is a perspective view of a first embodiment of a cell casing according to the invention, with the upper left-hand corner broken away;

Fig. 2 is a view similar to Fig. 1, showing a modification;

Fig. 4 is a perspective view of a terminal support forming part of the battery assembly of Fig. 3;

Fig. 5 is a perspective view of a terminal member cooperating with the support of Fig. 4;

Figure 3:
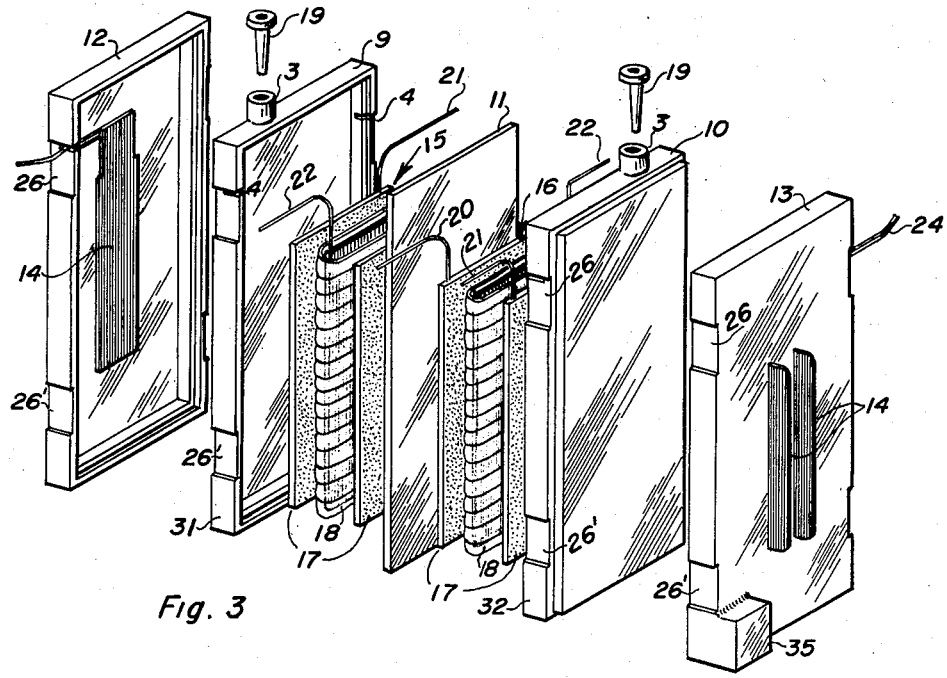
Fig. 3 is an exploded perspective view of the various elements of a two-cell battery according to the invention.

The cell casing shown in Fig. 1 comprises a thin, flat wall plate 1 of rectangular configuration. A flange-like frame 2 extends all around the plate 1. One of the shorter sides of frame 2 is provided with a nipple 3 for filling purposes. Each of the longer sides of frame 2 has, adjacent the short frame side carrying the nipple 3, a transverse slot 4 serving to accommodate a connecting lead for a respective electrode of the cell. A plurality of cell casings identical with the one one shown in Fig. 1 are assembled together to form a battery stack; this is accomplished by placing the free edge 5 of a preceding cell casing against the outer rear surface of the next succeeding one, the latter thereby closing the electrode chamber defined by the first-mentioned casing. The open side of the last cell casing of such stack can be closed by a separate plate member (not shown).

Advantageously, the cell casings in this and the following embodiments consist of plastic material, e. g. polystyrene, polymethyl acrylate, polyvinyl chloride or polyethylene.

The cell casings may be joined together by pasting. Alternatively, they may be assembled by coating their contact surfaces with a solvent for the plastic material, whereupon these surfaces are pressed together and the solvent is allowed to evaporate. They may also be united by a combination of heat and pressure.

The cell casing of Fig. 2 differs from that of Fig. 1 in that the free edge of its frame 2' is provided along its inner surface with a rabbet 6, the opposite frame edge flush with the outer face of wall 1 being formed with a complementary peripheral recess 7. This arrangement is particularly suitable where the cell casings are joined together by pasting or with the aid of a solvent. The complementary formations 6 and 7 also insure proper alignment of the cell casings, resulting in an unbroken outer surface for the battery stack.

In the embodiment of Fig. 3 there are provided two mutually identical cell casings 9 and 10, a plate-like coupling member 11 and two mutually identical terminal supports 12, 13 with terminals 14. The cell casings 9 and 10 are substantially the same as that of Fig. 2. Inside each cell casing there is shown in Fig. 3 a respective electrode assembly 15 or 16, each comprising two negative electrode plates 17 and a positive electrode plate 18; plate 18 is inserted between plates 17 and is held out of contact therewith by a suitable separator (not shown). If the elements 9, 10, 11, 12, 13, 15 and 16 of Fig. 3 are assumed to be displaced toward one another parallel to a line perpendicular to plate 11, a two-cell battery is obtained. The two open sides of casings 9 and 10 directed toward each other are then both closed by the common wall member 11. Connecting leads from each electrode assembly are led out through slots 4, the negative leads 20, 21 both passing through the slots on one side of the cell casing whereas the positive lead 22 traverses a slot on the opposite casing side.

If more than one cell is provided on either side of center plate 11, a battery composed of two cell stacks is obtained.

The cell casings and the coupling plate 11 are secured together by one of the methods referred to above, whereafter the electrolyte is introduced through the nipple 3 of each cell and a plug 19 is inserted into each nipple.

The terminal supports 12 and 13 may be constructed in the manner illustrated in Fig. 4, with their terminal member 14 corresponding to that shown in Fig. 5. The terminal supports shown in Figs. 3 and 4 are essentially of the same form as any of the associated cell casings, so as to admit of being included in a battery stack as the outermost elements thereof. The terminal member of Figs. 3–5 comprises a base 23, designed to be applied against that side of the associated support 12 or 13 which faces the adjacent cell. A terminal lead 24 is fixed, e. g. by soldering, to the base 23. Base 23 is formed with two upstanding wings 25 which constitute a pair of contact blades and extend outwardly through corresponding slots provided in the terminal support. A single such contact blade may be sufficient in the case of smaller output currents. Terminal members of this character have proved to be advantageous in that they occupy little space and have low weight while still enabling currents of large magnitudes to be withdrawn.

Figure 6:
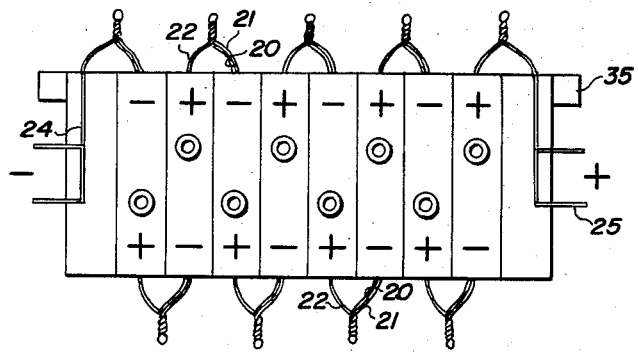
Figs. 6 and 7 are a top plan view and perspective view, respectively, of a battery having series-connected cells in accordance with the invention.
Figure 7:
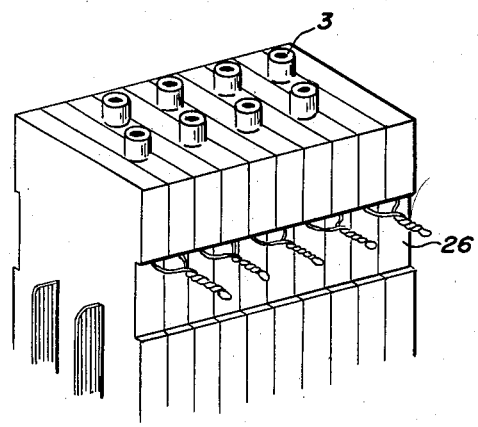
Figures 8, 9, 10:
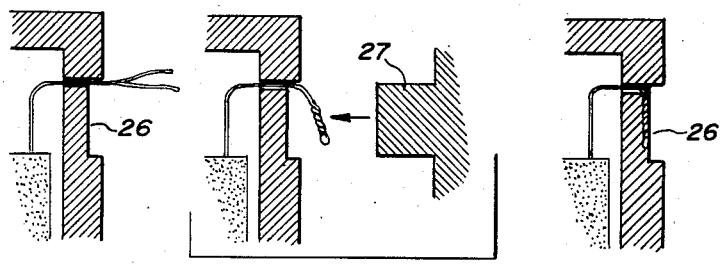
Figs. 8, 9 and 10 illustrate three successive operational steps in assembling the battery.

In the assembly of a battery from a plurality of cell casings according to the invention it is desirable to have the connecting leads projecting from each side, by way of slots 4, of alternately positive and negative polarity as shown in Fig. 6. Next, adjacent leads of different cells are joined together in pairs, as illustrated, and each of the odd outermost leads is similarly joined to a corresponding terminal lead on its respective end of the stack. The connecting leads 20, 21, 22 and terminal leads 24 may be interconnected by twisting and welding or soldering. A welded connection is illustrated by way of example in Fig. 7.

The following procedure may be used for obtaining a fluid-tight lead-through of the connecting wires at slots 4:

After the electrodes have been inserted in the still open cell casing, thus before the next casing is joined to it, and after the connecting lead has been placed in its respective slot 4, the latter is filled by the introduction of a small amount of cement. It is also possible to seal in the wire by thermal fusion and addition of plastic material.

The connecting leads projecting from the assembled battery, upon having been fused together and sealed in place, are pressed into a grove which is formed by a series of aligned external recesses 26 provided for this purpose in each of the major sides of each cell casing, see Figs. 3 and 8-10. This is effected most simply by bringing a heated metal plunger 27 (Fig. 9) to bear upon the conductor wire which is bent down initially to a certain degree. After this wire has been impressed into the thermoplastic material for a sufficient length of time, the plunger 27 is cooled and removed.

Figure 11:
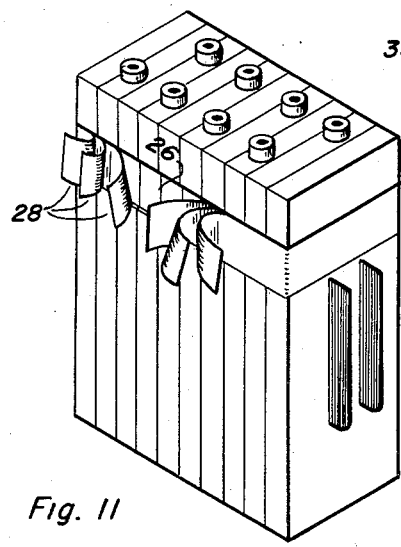
Fig. 11 is a perspective view showing the cell assembly provided with a retaining strap.

Since the points of emergence of the lead wires from the casings may not be completely fluid-tight, the leakproofness of the finished stack may be increased by a further safety measure comprising the introduction of a small amount of cement into any cracks that may have remained at the slots 4. This may be effected in simple manner through the creation of a partial vacuum within each cell by exhausting part of the air therefrom through nipple 3. A retaining strap 28 of insulating material (see Fig. 11) is finally placed in the groove formed of recesses 26, these recesses being also provided in the terminal supports 12 and 13. The strap 28 may be made, for instance, of matted or woven glass fibers and may be secured within its groove by cementing or by the polymerization of a plastic material. The strap thus forms a physical protection for the electrical inter-cell connections and absorbs part of the mechanical stresses exerted upon the casing unit by the swelling of the electrodes and separators. The strap further serves to reinforce the ends of the cell assembly, thereby preventing a detachment of the contact-carrying members thereof upon insertion of the battery into or removal from a box or holder.

In some cases it will also be desirable to apply a second, similar strap (not shown) to a groove formed by recesses 26' near the bottom of the cell casings.

Figure 12:
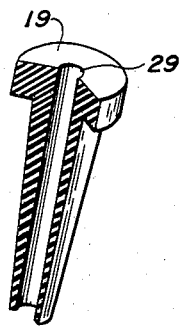
Fig. 12 illustrates a plug for the filling opening of a cell casing.

The introduction of electrolyte takes place through the nipples 3 of the cell casings. These nipples are preferably arranged along a zig-zag line as viewed from above (see Fig. 6) so as to afford the greatest possible spacing between adjacent nipples. In order to minimize the danger of electrolyte leakage upon a tilting of the battery, each nipple may be provided with a conical plug 19, e. g. as shown in Fig. 12. Each of these plugs is provided with a central, axial air channel 29. The plugs advantageously consist of a relatively soft plastic material, e. g. polyethylene.

Figure 13:
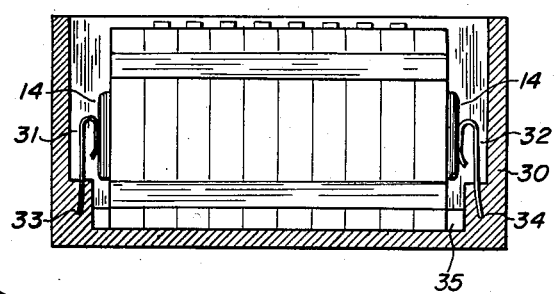
Fig. 13 shows the insertion of the cell assembly into a battery box.

In many instances it will be desirable to encase a finished cell assembly in a special, protective battery box. A suitable box 30 of this type is shown in Fig. 13. This box is provided on its inner end faces with resilient contact members 31, 32 adapted to be engaged by the terminal elements 31, 32 and to serve as output connectors. In order to prevent insertion of a battery into the box with inverted polarity at the contact members 31, 32, the box may be provided with lugs 33, 34. The terminal supports 12 and 13 are provided with corresponding projections 35 so positioned as to come to rest upon the lugs 33, 34 when an attempt is made to insert the battery in the wrong position, thereby preventing the battery from fully entering into the box 30.

The invention is most advantageously embodied in a rechargeable electrochemical battery of the alkaline silver-zinc type consisting of, for example, ten cells connected in series. Such a battery has been found capable of delivering 250 watts over a period of at least 15 minutes. Conventional batteries of this type and capacity have a weight in excess of 1800 grams and a volume of approximately 900 cubic centimeters. When constructed in accordance with the present disclosure, the weight of the battery is reduced to 1000 grams and its volume to 650 cubic centimeters. This corresponds to a saving of about 45% in weight and about 35% in volume by virtue of the present improvement. Such saving, in turn, may entail a reduction in cost by more than 60%.

We claim:

1. An electrochemical battery comprising a plurality of substantially identical cells; each of said cells comprising a rigid tray-like casing of insulating material including a frame and a wall plate spanning one side of said frame, an electrode assembly in said casing, and conductor means extending outwardly through said frame from said electrode assembly; said casing being assembled in a stack and forming a plurality of electrode compartments electrolytically isolated from one another by said wall plates, said stack further including a pair of end members substantially co-extensive with said casings; terminal means carried on each of said end members; and connector means joining said conductor means to one another and to said terminal means, said electrode assembly including at least one positive and at least one negative electrode, said conductor means comprising a first wire extending from said positive electrode through one side of said frame and a second wire extending from said negative electrode through the opposite side of said frame, said connector means joining alternate ones of said first and second wires together and to one of said terminal means in a first series circuit and separately joining alternate ones of said first and second wires together and to the other of said terminal means in a second series circuit.

2. An electrochemical battery according to claim 1, wherein said frame is provided with at least one slot traversed by said conductor means, further comprising packing means sealing said conductor means in fluidtight manner in said slot.

3. An electrochemical battery according to claim 1, wherein each of said end members is a tray substantially identical with said casings and comprising a slotted end plate, said terminal means comprising a metallic blade having a first portion in contact with the inner face of said slotted end plate and having a second portion traversing said slotted end plate substantially at right angles to said first portion.

4. An electrochemical battery according to claim 1, wherein at least one of said end members is provided with an eccentric formation adapted to locate said stack with respect to a receptacle therefor.

5. An electrochemical battery comprising a plurality of cells; each of said cells comprising a rigid casing of insulating material including a wall plate provided with a marginal flange, an electrode assembly in said casing, said electrode assembly including at least one positive and at least one negative electrode, first conductor means extending from said positive electrode through one side of said frame, and second conductor means extending from said negative electrode through another side of said frame; said casings being assembled in a stack and forming a plurality of electrode compartments electrolytically isolated from one another by said wall plates and with said first and second conductor means alternately projecting from one and another side of the stack; first connector means serially interconnecting the alternating first and second conductor means of adjacent cells projecting on said one side of said stack; and second connector means serially interconnecting the alternating first and second conductor means of adjacent cells projecting on other side of said stack, said flanges following one another without spacing and forming a substantially continuous surface on at least a major part of said stack, said stack being provided with a longitudinal recess extending along said continuous surface and receiving projecting portions of said conductor means along with said connector means.

6. An electrochemical battery according to claim 5, further comprising a retaining strap lodged in said recess and holding said projecting portions in place.

7. An electrochemical battery according to claim 5, wherein each of said casings is provided with a filling aperture on one side of its said frame, alternate ones of said filling apertures being relatively offset on said stack.

8. An electrochemical battery according to claim 7, wherein each of said cells is provided with an axially perforated conical plug seated in said filling aperture.

9. In an electrochemical battery, in combination, a first rigid tray and a second rigid tray stacked together, each of said trays being of insulated material and having a wall portion provided with a marginal flange, said first tray being further provided with a closure plate spaced from said wall portion thereof and defining therewith a first chamber, said wall portions of both of said trays being spaced from each other and together defining a second chamber electrolytically insulated from said first chamber, electrode means in said first chamber, terminal means in said second chamber, and conductor means electrically interconnecting said electrode means and said terminal means, said first and second trays being substantially identical, the said flanges thereof adjoining each other without spacing and forming a substantially continuous surface, said conductor means extending in part externally of said trays, said flanges being provided with aligned recesses together forming a groove, said conductor means being in part received in said groove.

10. The combination according to claim 9, further comprising retaining strap means lodged in said groove and holding said conductor means in place.

11. The combination according to claim 9, wherein said terminal means comprises a metal plate within said terminal chamber having a pair of prongs projecting outwardly through said wall portion of said second tray.

12. In an electrochemical battery, in combination, an electrolytically impermeable partition member, a plurality of stacked rigid casings of insulating material each having a frame and a wall member spanning one side of said frame, said frame having its other side open and facing toward said partition member, an electrode assembly in each of said casings, said casings being positioned partly on one and partly on the opposite side of said partition member and electrolytically separated by the latter from each other, thereby forming a stack containing said partition member sandwiched between two of said casings, a pair of terminal members on respective ends of said stack, and conductor means extending between each electrode assembly and said terminal members.

13. The combination according to claim 9 wherein said terminal members and said casings are substantially coextensive with one another and forming a substantially continuous surface together, said surface being provided with at least one longitudinal groove extending from one of said terminal members to the other and receiving part of said conductor means.

References Cited in the file of this patent

UNITED STATES PATENTS

| | | |
|---|---|---|
| 274,802 | Martin | Mar. 27, 1883 |
| 2,277,763 | Keen | Mar. 31, 1942 |
| 2,627,534 | Arbogast | Feb. 3, 1953 |
| 2,636,060 | Fischbach et al. | Apr. 21, 1953 |
| 2,701,271 | Mautner et al. | Feb. 1, 1955 |
| 2,713,602 | Shuman | July 19, 1955 |